UNITED STATES PATENT OFFICE 2,059,052

CLEANING AND POLISHING MATERIAL

Frederick W. Sperr, Jr., Vineland, N. J.

No Drawing. Application October 25, 1934, Serial No. 750,021

4 Claims. (Cl. 87—5)

My invention relates to materials for cleaning and polishing lustrous surfaces, such as surfaces composed of metals, glass, porcelain, "Bakelite" and similar materials, "Duco" and other lacquers and varnishes, and the like.

Certain of the compositions set forth and described hereinbelow are especially adapted for use as metal polishes, while others are intended to be employed as automobile polishes, as will be made clear, but most of the compositions within the contemplation of my invention are possessed of wide utility, and are adapted to be used for polishing a wide variety of metals and other materials.

My invention has for an object the provision of cleaning and polishing materials which are effective, cheap, and non-poisonous in character, although my invention does not necessarily exclude the use of poisonous materials as ingredients of the polishing and cleaning materials set forth herein.

My invention has for further objects such additional improvements, advantages and results as may hereinafter be found to obtain.

I have discovered that the liquor produced in the treatment of coal gas for the removal of hydrocyanic acid therefrom, and hereinbelow referred to as "thiocyanate gas liquor", has a remarkably effective action upon metallic tarnish films or stains, and is adapted for use, with or without chemical treatment as set forth, and either alone or preferably combined with other materials, as a cleaning and polishing agent for the purposes recited herein.

I have also found such thiocyanate gas liquor has the property of imparting or restoring a brilliant lustre or polish to a great variety of surfaces, an effect which is entirely apart from its specific solvent effect upon metallic tarnishes. This striking effect gives my compositions value for cleaning and polishing non-metallic surfaces, in addition to its beneficial effects as a metal polish, and adds greatly to the general utility and versatility of my materials.

As will be set forth more fully hereinbelow, the thiocyanate gas liquor is preferably combined with suitable abrasives, polishers, fillers and other materials known in the art, as well as certain other ingredients, the use of which in materials of the class recited is believed to be novel. The liquor may be used in an alkaline condition (being normally produced in that state), or it may be neutralized or acidified in the course of preparing the ultimate polishing material. It may be compounded as a liquid, a jelly, a paste or a solid, or it may be used to impregnate polishing cloths and the like. In each of these several forms, this material has useful and special properties adapted for different purposes.

As a preferred example of the thiocyanate gas liquor referred to herein, I may cite the liquor obtained when coal gas containing HCN, $H_2S$ and $NH_3$ is scrubbed with an aqueous suspension of sulfur. Ammonia and $H_2S$ are absorbed, reacting with the sulfur to form ammonium polysulfide, which in turn reacts with the HCN to form ammonium thiocyanate. Ammonium thiosulfate is also formed, as is also ammonium carbonate, the latter due to the presence of $CO_2$ in the gas treated. A typical liquor of the character, having a specific gravity of 1.20, showed the following constituents upon analysis:

| | Grams per liter |
|---|---|
| $NH_4CNS$ | 250 |
| $(NH_4)_2S_2O_3$ | 40 |
| $(NH_4)_2CO_3$ | 40 |
| Free $NH_3$ | 17 |
| Sulfides, (as $H_2S$) | 1 |

This liquor also contains small amounts of organic materials, such as phenols, the presence of which is not necessarily disadvantageous and may even be desirable.

When the gas treated does not contain ammonia, as for example when ammonia normally present in coal gas has previously been removed by contact with sulfuric acid or otherwise, the ammonia-free gas may be treated for the removal of HCN by scrubbing it with a solution of a polysulfide of an alkali metal such as sodium or potassium, or of an alkaline earth metal such as calcium or magnesium. In this event, the resultant liquor will contain the thiocyanate and thiosulfate of the particular alkali metal or alkaline earth metal, the polysulfide of which has been employed. Such liquor is also included within the designation "thiocyanate gas liquor". It will be understood that, in referring to the compounds present in such liquor or in my various compositions, all of the above alkali metals and alkaline earth metals, as well as ammonia, even though the latter is not actually a metal, are included within the general term "alkali-forming metals."

I have found that thiocyanate gas liquor, produced as indicated hereinabove, is far more effective for the purposes recited than are simple solutions of any of the constituents thereof alone. For example, a simple aqueous solution of a thiocyanate does not have the remarkable cleaning and polishing properties of thiocyanate gas liquor, especially when employed in one of the embodiments of my invention set forth hereinbelow.

One of the most important advantages of the by-product thiocyanate gas liquor resides in the fact that it has a high surface tension and the property of wetting surfaces readily, even when such surfaces have not been carefully cleaned. Thus the thiocyanate gas liquor wets glass thoroughly, even when no special precautions have been taken to clean the glass, whereas a simple solution of ammonium thiocyanate is repelled by even slight grease or oil films. This property is, of course, extremely valuable in using the liquor for cleaning and polishing purposes.

Moreover, the thiocyanate gas liquor combines with material such as paper pulp to form stable jellies more readily than do simple solutions of its principal constituents, and when treated in accordance with my invention is possessed of marked advantages in cleaning and polishing various metals.

Before employing thiocyanate gas liquor for the purpose indicated, or before using it as an ingredient of a cleaning and polishing material, it may be desirable to remove from the liquor, by filtration, decantation or solvent extraction, any suspended tarry matter which may be present in the liquor as produced or recovered. Benzol is a satisfactory solvent for removing such tar, but it will be obvious that other solvents may be employed.

For cleaning and polishing purposes, the thiocyanate gas liquor, freed from suspended tar and any other undesirable impurities, may be used alone. This is particularly true with regard to the cleaning and polishing of chromium plate, stainless steel and other materials unaffected by sulfides, as well as glass, lacquer and other non-metallic surfaces. In such cases, as for example when it is desired to prepare a polish especially suitable for automobile bodies and fenders, good results are obtained by combining the liquor with a soft, non-abrasive filler, preferably of an absorbent character, such for example as paper pulp or other cellulosic or vegetable pulp, or kaolin, or both kaolin and pulp, in amount sufficient to form a paste of desired consistency. Very remarkable cleaning and polishing effects are obtained with a paste of this type into which has been incorporated a fatty acid or a fatty-acid ester. Thus, I have used a composition having the following formula with excellent results:

| | Parts by weight |
|---|---|
| Thiocyanate gas liquor | 50 |
| Kaolin | 30 |
| Paper pulp | 10 |
| Stearin | 10 |

This particular composition, while of general utility, is especially useful as an automobile polish. Small amounts of aromatic oils or other odoriferous substances may be added as desired.

The thiocyanate gas liquor may be used to clean and polish copper and its alloys, such as brass and bronze, but in some cases I have observed a slight tendency to retarnish, due to the small amounts of sulfides ordinarily present in the liquor. This tendency may be eliminated by adding to the liquor some substance, such for example as zinc oxide, which is capable of reacting with any sulfides present to form an inert compound or compounds. It is not ordinarily necessary, for this purpose, to add more than about 1 per cent by weight of zinc oxide to the liquor, although the amount used may vary considerably.

The use of a much larger proportion of zinc oxide gives an entirely different type of product, which has useful polishing and cleaning properties. Relatively large quantities of zinc oxide, when added to the thiocyanate gas liquor, produce materials of heavy consistency which will harden to a solid mass. Thus, for example, when 100 parts by weight of zinc oxide are stirred into 70 parts by weight of thiocyanate gas liquor, the resultant liquor, which barely flows when fresh, after being poured into molds and allowed to stand for, say, 24 hours, will harden to a stone-like mass which has excellent polishing properties. It will be understood that while the proportions recited are typical, other proportions may be employed over a wide range, depending upon the strength of the liquor and the results desired.

The hardened material thus obtained makes an excellent polishing stone, and may be used as such. Or, if a wet cloth is rubbed over the surface of this material, enough polishing agent will be transferred to the cloth to remove ordinary tarnish from silver, copper and other metals. As an alternative method of utilizing this material, it may be pulverized after hardening, and the finely pulverized product may be combined with soaps or oils or other grease-attacking materials to form special cleaning and polishing compositions which are especially useful where much greasy dirt has to be removed.

The materials referred to in the last two paragraphs, and methods of making the same, are specifically claimed in my copending application Serial No. 103,024, filed September 28 1936, which application is in part a continuation of this application.

As has been indicated hereinabove, where the liquor is to be used for the cleaning and polishing of heavily tarnished metals, it is desirable to combine it with a suitable abrasive, the harshness of which is governed by the hardness of the surface to be polished. In preparing compositions to be used for polishing copper, zinc, pewter and other soft metals or alloys, I may employ cellite or infusorial earth, whereas pumice may be used in preparing compositions to be used for polishing steel and the harder bronzes. The thiocyanate gas liquor combines with infusorial earth or pumice to form stable jellies, which may be used where polishing materials of relatively stiff consistencies are desired. Thus, I have prepared a jelly-like polishing composition having the following proportions of ingredients:

| | Parts by weight |
|---|---|
| Thiocyanate gas liquor | 50 |
| Pumice or infusorial earth | 100 |

When a material of lighter consistency is desired, the proportion of abrasive may of course be reduced to a point where the mixture is freely liquid, the abrasive going readily into suspension upon shaking. As a typical example of this type of material, I may employ a mixture comprising:

| | Parts by weight |
|---|---|
| Thiocyanate gas liquor | 100 |
| Pumice or infusorial earth | 25 |

Zinc oxide may be incorporated into any of the above formulæ, the preferred proportion being about 1 per cent by weight of the liquor.

The materials described hereinabove are ordinarily of alkaline reaction, due to the presence in the original liquor of ammonia and ammonium carbonate. This is often advantageous on account of the detergent effect of these compounds.

In other instances, however, I have found that it is better to employ a composition having a neutral or acid reaction. For example, I have found this to be true where the material is to be used for polishing silver, lead, pewter, steel and cast aluminum, and it is also true with regard to copper and its alloys, for although the latter can readily be polished with the alkaline liquor or a composition containing it, there is less tendency to retarnish when an acid is employed.

While various acids may be employed for this purpose, I have found it generally advantageous to employ acids other than those commonly known as mineral acids, and I prefer to employ organic acids, such, for example, as acetic acid, oxalic acid, maleic acid, citric acid and the like. Acetic acid is cheap and non-poisonous, and is preferred.

When glacial acetic acid is added to the liquor in amount just sufficient to neutralize the ammonia and ammonium carbonate, a clear, dark red liquor results. Upon further addition of the acid, the liquor becomes lighter in color and a voluminous flocculent precipitate slowly separates. The latter may readily be removed by filtration, leaving a clear, light red liquor having excellent solvent properties. This product, for example, readily removes sulfide tarnish from silver, leaving the metal clean and lustrous.

A composition suitable for cleaning aluminum, nickel and ornamental bronze may be prepared by adding 20 ml. of glacial acetic acid to 100 ml. of thiocyanate gas liquor, filtering the thereby acidified mixture, diluting the filtrate with water to 180 ml. and adding 40 grams of infusorial earth. It will of course be obvious that both the extent of dilution and the amount of abrasive may be varied as desired.

For polishing brass, the thiocyanate liquor should be treated with about 1 per cent zinc oxide and filtered. The product is an extremely satisfactory brass polish, with or without the additional abrasives such as pumice, being far superior to simple solutions of ammonium thiocyanate or the like, especially with respect to retarnishing of the polished metal.

For polishing lead and pewter, it is advisable to use an acidified liquor, and for silver, both acidification and addition of a sulfide-neutralizing agent, such as zinc oxide, are desirable.

The thiocyanate gas liquor, in either alkaline, neutral or acid condition, and with or without the addition of zinc oxide, abrasives and other substances, may be used for the preparation of polishing cloths and the like, which may be prepared by immersing a suitable fabric in the liquid and removing the excess liquid. The hygroscopic character of the thiocyanate preserves such cloths in a soft, semi-moist condition, well suited for cleaning and polishing purposes.

As I have indicated, the cleaning and polishing properties of thiocyanate gas liquor and the compositions which I have described as prepared therefrom are truly remarkable. Very heavy deposits of metallic oxides and sulfides yield to these materials with little difficulty, even without the use of abrasives, although it is usually preferred to employ a suitable abrasive in order to enhance the effectiveness of the polishing material.

An outstanding advantage of the thiocyanate gas liquor, in comparison with sodium cyanide, oxalic acid and other materials commonly used in metal cleaning and polishing compositions, resides in its non-poisonous character. Moreover, it does not injure the skin at these other materials do, and it is relatively of much lower cost. There is no danger of its evolving noxious fumes under any conditions.

While I have set forth hereinabove, by way of exemplification, various preferred forms and embodiments of my invention, as well as various preferred compositions, it will be understood that my invention is not limited to such preferred instances or embodiments, but may variously be practiced and embodied within the scope of the claims hereinafter made. For example, in place of zinc oxide, I may employ other zinc compounds, such as zinc acetate or zinc sulfate, or similar compounds of copper, or other compounds adapted to neutralize or remove sulfides.

I claim:

1. A soap-free metal-tarnish removing material consisting essentially of a "thiocyanate gas liquor" free from soluble sulphides.

2. A soap-free metal-tarnish removing material consisting essentially of a "thiocyanate gas liquor" free from soluble sulphides, and a soft abrasive material.

3. A soap-free metal-tarnish removing material consisting essentially of a "thiocyanate gas liquor" and containing zinc oxide in an amount at least sufficient to free the liquor from soluble sulphides.

4. A soap-free metal-tarnish removing material consisting essentially of a "thiocyanate gas liquor" neutralized by the addition of a water-soluble aliphatic organic acid.

FREDERICK W. SPERR, Jr.